United States Patent
Murakami (10) Patent No.: US 8,251,514 B2
(45) Date of Patent: Aug. 28, 2012

(54) REAR PROJECTION IMAGE DISPLAY DEVICE WITH A PLANE REFLECTION MIRROR

(75) Inventor: Koichi Murakami, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 379 days.

(21) Appl. No.: 12/581,050

(22) Filed: Oct. 16, 2009

(65) Prior Publication Data

US 2010/0110394 A1    May 6, 2010

(30) Foreign Application Priority Data

Nov. 6, 2008    (JP) ................... 2008-285162

(51) Int. Cl.
*G03B 21/14* (2006.01)

(52) U.S. Cl. .......................................... 353/69
(58) Field of Classification Search .......... 353/46, 353/47, 50, 51, 69, 67, 77, 78, 98, 99; 359/846, 359/847; 348/746
See application file for complete search history.

(56) References Cited

U.S. PATENT DOCUMENTS 7,370,976 B2 * 5/2008 Fujinuma .................. 353/69

2008/0284986 A1   11/2008 Tachibana

FOREIGN PATENT DOCUMENTS

| JP | 11-153760 | | 6/1999 |
|---|---|---|---|
| JP | 2002-77777 | A | 3/2002 |
| JP | 2002077777 | A * | 3/2002 |
| JP | 3559735 | B2 | 9/2004 |
| JP | 2004-361748 | | 12/2004 |
| JP | 3972915 | B2 | 9/2007 |
| JP | 2008-033290 | | 2/2008 |

* cited by examiner

*Primary Examiner* — Georgia Y Epps
*Assistant Examiner* — Renee Naphas
(74) *Attorney, Agent, or Firm* — Birch, Stewart, Kolasch & Birch, LLP (57) ABSTRACT

A rear projection image display device according to an aspect of the present invention for projecting an image from a projection device onto a screen from a rear side, includes a plane reflection mirror for changing an optical path of the image from the projection device, fixing members for fixing more than one points on the periphery of the reflection mirror, rod-shaped reinforcement members fastened along the periphery and arranged inside the periphery in the rear side of the reflection mirror, support members being movable in a direction perpendicular to a surface of the reflection mirror, for supporting predetermined points between the fixing members on the periphery of the reflection mirror.

5 Claims, 8 Drawing Sheets

PERIPHERY OF IMAGE

FIG. 8

PERIPHERY OF IMAGE

REAR PROJECTION IMAGE DISPLAY DEVICE WITH A PLANE REFLECTION MIRROR

BACKGROUND OF THE INVENTION

1. Field of the Invention

The present invention relates to a rear projection image display device for changing an optical path of an image from a projection device with a reflection mirror, and projecting the image onto a screen from the rear side.

2. Description of the Background Art

Recent years, much larger screen and much higher definition is required in a large screen display system (multi-vision or video wall) as a large monitor for a monitoring and controlling system and other similar systems, the large screen display system being obtained by stacking rear projection image display devices for changing an optical path of an image from a projection device with a reflection mirror and projecting the image onto a screen from the rear side, vertically and horizontally.

When a CRT projector was used as a projection device, electrical correction was added to the inputted image. Currently, higher definition of an image is required, and the mainstream is that the inputted image is projected onto a screen as it is without any electrical correction, by the use of a liquid crystal device, a digital image device, and other similar devices.

On the other hand, optical system distortion due to projection lens and image distortion due to deflection of a reflection mirror are caused in the rear projection image display device for changing an optical path of an image from a projection device with the reflection mirror, and projecting the image onto a screen from the rear side. Therefore, it is difficult to depict the inputted image onto the screen truly and without any lack of the image. Particularly these days, display devices are rapidly increased in size, so that image distortion is much easier to be recognized.

Here, the optical system distortion due to the projection lens and the image distortion due to the deflection of the reflection mirror will be described. As the optical system distortion due to the projection lens, pin distortion in which periphery of an image bows inwardly seen from a screen side, and barrel distortion in which periphery of an image bows outwardly in a pot-bellied shape, are well known.

When the reflection mirror is deflected by its own weight, it is also well known that the image projected from the projection device is produced as pin distortion as described above when seen on a screen.

As a countermeasure to correct the aforementioned image distortion, an image distortion correcting mechanism of a projection image display device is provided, including a reflection mirror having a trapezoidal opening, a support unit disposed near four corners of the opening of the reflection mirror so as to cover the opening, for supporting the reflection mirror, and an adjustment unit disposed near the center of each of four sides of the opening of the reflection mirror, for pressing the reflection mirror (see Japanese Patent Application Laid-Open No. 2002-77777, for example).

Further, a projection display device is provided, including an adjustment mechanism changing a flatness of the reflection mirror on the periphery in accordance with a necessary part unit of the reflection mirror (see Japanese Patent Application Laid-Open No. 2001-109071, for example). Still further, an image distortion correcting mechanism of a rear projection image display device is provided, including an adjustment fitting attached so as to correspond to a support fitting for supporting an upper side of the reflection mirror to be sandwiched therebetween, an adjustment screw and a nut for joining the support fitting and the adjustment fitting in the upper side of the reflection mirror, a support fitting being disposed in each side of the reflection mirror and including a plurality of screw holes to which each of the adjustment screws is attached, for supporting each side of the reflection mirror to be sandwiched between the both sides from back and front with the adjustment screw, and a plurality of adjusting screws attached to the screw holes, whereby the support fitting of the upper side of the reflection mirror is adjusted in the vicinity by the adjustment screw and the nut, and the number and position of the adjusting screws attached to the plurality of the screw holes are changed so as to correct deflection of the reflection mirror (see Japanese Patent Gazette No. 3972915, for example).

However, the image distortion correcting mechanism disclosed in Japanese Patent Application Laid-Open No. 2002-77777 had a problem that when the size of the reflection mirror is large, distortion correction does not make a screen linear on the periphery, resulting in an unnatural image. This is because the shape of the reflection mirror is changed only locally, if the size of the reflection mirror becomes larger and the side to be corrected becomes longer, since the reflection mirror is an elastic body, causing wavelike behavior of the reflection mirror. Particularly, the size of the reflection mirror is increasing according to the increase in size of a screen, so that the aforementioned image distortion cannot be ignored when seen on the screen.

As disclosed in Japanese Patent Application Laid-Open No. 2001-109071 and Japanese Patent Gazette No. 3972915, many correction points are prepared in the respective sides of the reflection mirror, and the reflection mirror is not deformed as extremely wavelike as in Japanese Patent Application Laid-Open No. 2002-77777 by correcting several points of the respective sides. As a result, the image of the corrected side looks like substantially linear on the periphery when seen from the screen side. However, several points are needed to be adjusted for one screen in order to correct image distortion of each side of the screen. Therefore, tremendous points are needed to be adjusted for one device in the large screen display system (multi-vision or video wall) obtained by stacking image devices vertically and horizontally, causing a lot of trouble and time in installing an image device. Particularly, since adjustment time and accuracy varies according to the ability of an operator who installs and adjusts a device, it has been difficult to correct image distortion uniformly. Further, many structures have been needed to be prepared, resulting in cost-intensive.

SUMMARY OF THE INVENTION

It is an object of the present invention to correct optical system distortion due to projection lens and image distortion of each side of a screen due to deflection of a reflection mirror so as to be naturally linear by easily adjusting only one point of each side of the reflection mirror, even if the reflection mirror is large, in a rear projection image display device for changing an optical path of an image from a projection device with a reflection mirror, and projecting the image onto a screen from the rear side.

According to an aspect of the present invention, a rear projection image display device for projecting an image from a projection device onto a screen from a rear side, includes: a plane reflection mirror, fixing members, rod-shaped reinforcement members and support members. The mirror changes an optical path of the image from the projection device.

The fixing members fix more than one points on the periphery of the reflection mirror.

The reinforcement members is fastened along the periphery and arranged inside the periphery in the rear side of the reflection mirror.

The support members is movable in a direction perpendicular to a surface of the reflection mirror, for supporting predetermined points between the fixing members on the periphery of the reflection mirror.

The present invention provides the rear projection image display device reproducing graphics more truly by correcting the optical system distortion due to projection lens of the projection device and the image distortion due to deflection of the reflection mirror by only correcting one part of each side of the reflection mirror.

These and other objects, features, aspects and advantages of the present invention will become more apparent from the following detailed description of the present invention when taken in conjunction with the accompanying drawings.

DESCRIPTION OF THE PREFERRED EMBODIMENTS

Hereinafter, the present invention will be described in detail referring to the drawings showing the preferred embodiment.

(Configuration)

Figure 1:
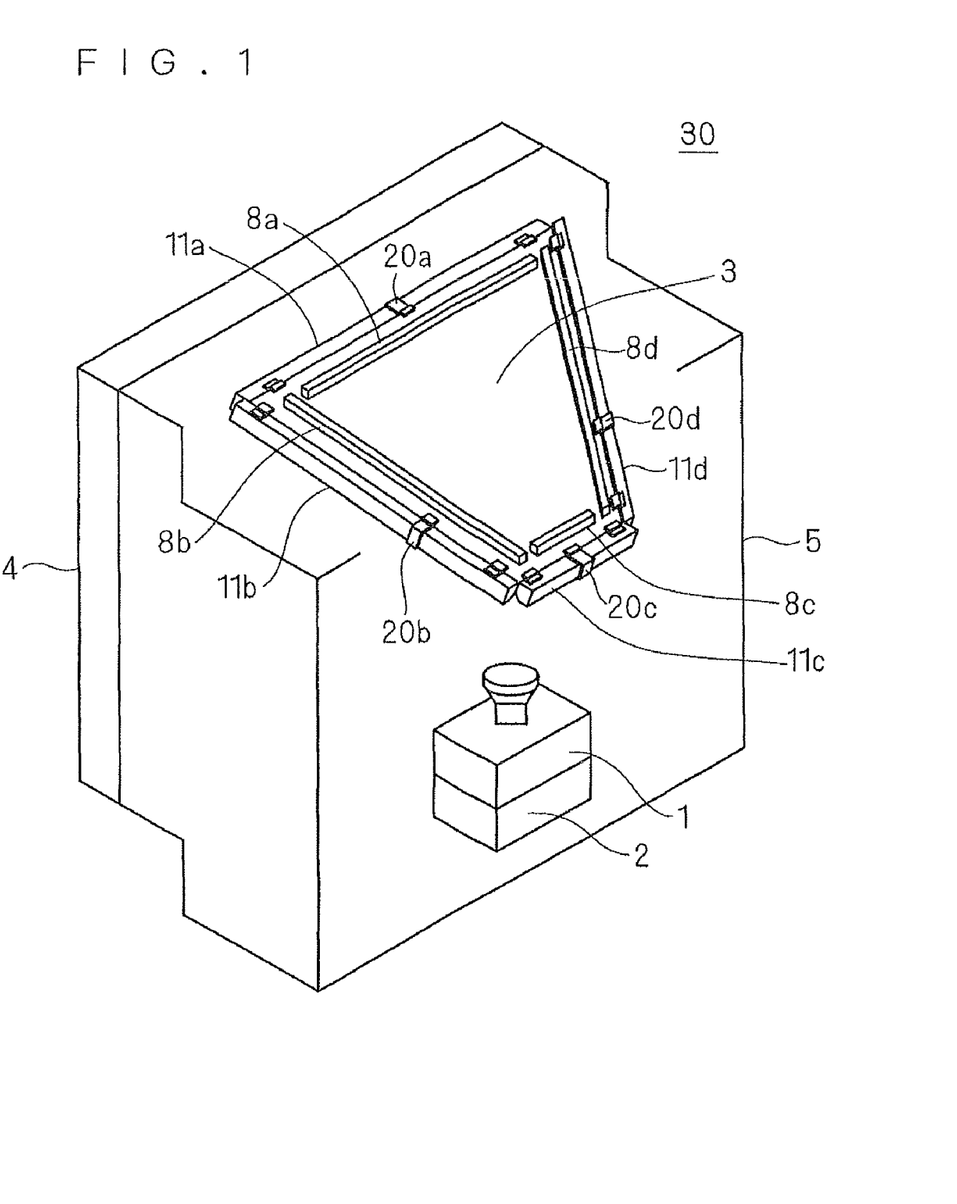
FIG. 1 is a view of a rear projection image display device according to the present invention.

FIG. 1 is an outside transparent perspective view showing a main configuration of a rear projection image display device 30 employing an image distortion correcting mechanism according to the present invention.

As shown in FIG. 1, the rear projection image display device 30 is configured as follows. A projection device 1 is disposed on a position adjuster 2 disposed at a bottom of inside of a cabinet 5 of the rear projection image display device 30, and thereabove, a reflection mirror 3, which is a polygon such as a rectangle, or a trapezoid (trapezoid is employed in the present preferred embodiment), is disposed with a reflection surface downward with a certain angle, and then a screen 4 is attached at the front. With these, a projected image outputted form the projection device 1 is projected onto the screen 4 after changing an optical path with the plane reflection mirror 3. That is, the rear projection image display device 30 is a device for projecting the image from the projection device 1 onto the screen 4 from the rear side.

Figure 2:
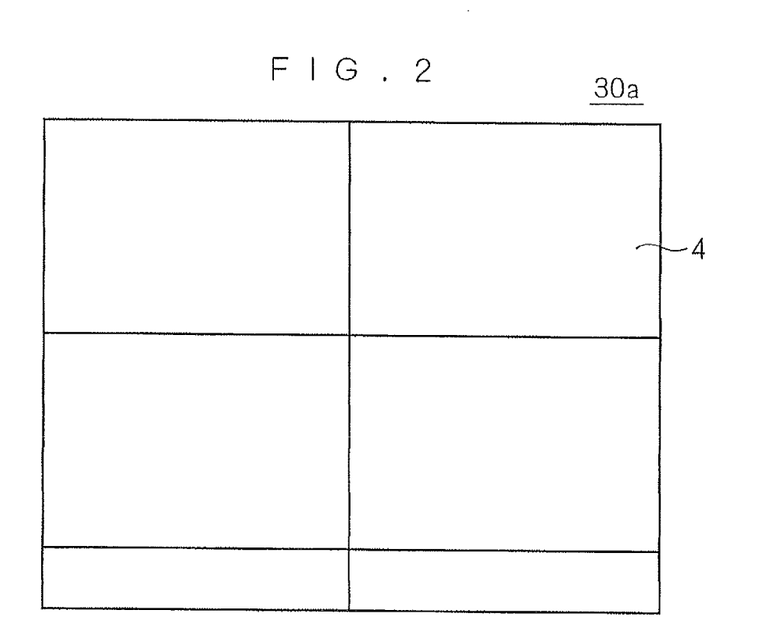
FIGS. 2 and 3 are views of examples of a large screen of the rear projection image display device according to the present invention.
Figure 3:
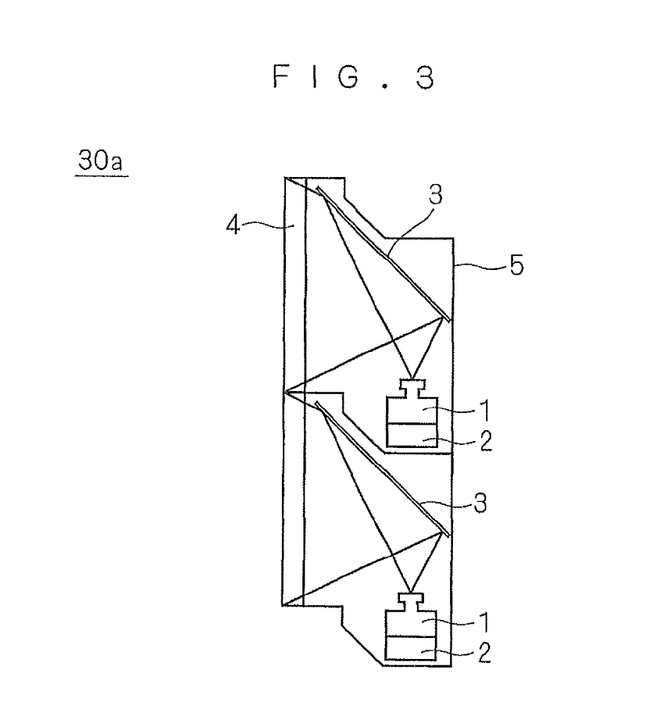

FIGS. 2 and 3 show examples of configuration of a large screen display system 30a (multi-vision or video wall) forming one large screen by stacking the rear projection image display device 30 having the above configuration vertically and horizontally. FIG. 2 is a front view seen from the screen side, and FIG. 3 is a side view thereof. As shown in FIGS. 2 and 3, this large screen display system 30a is configured to form one multi-screen with four rear projection image display devices.

Figure 4:
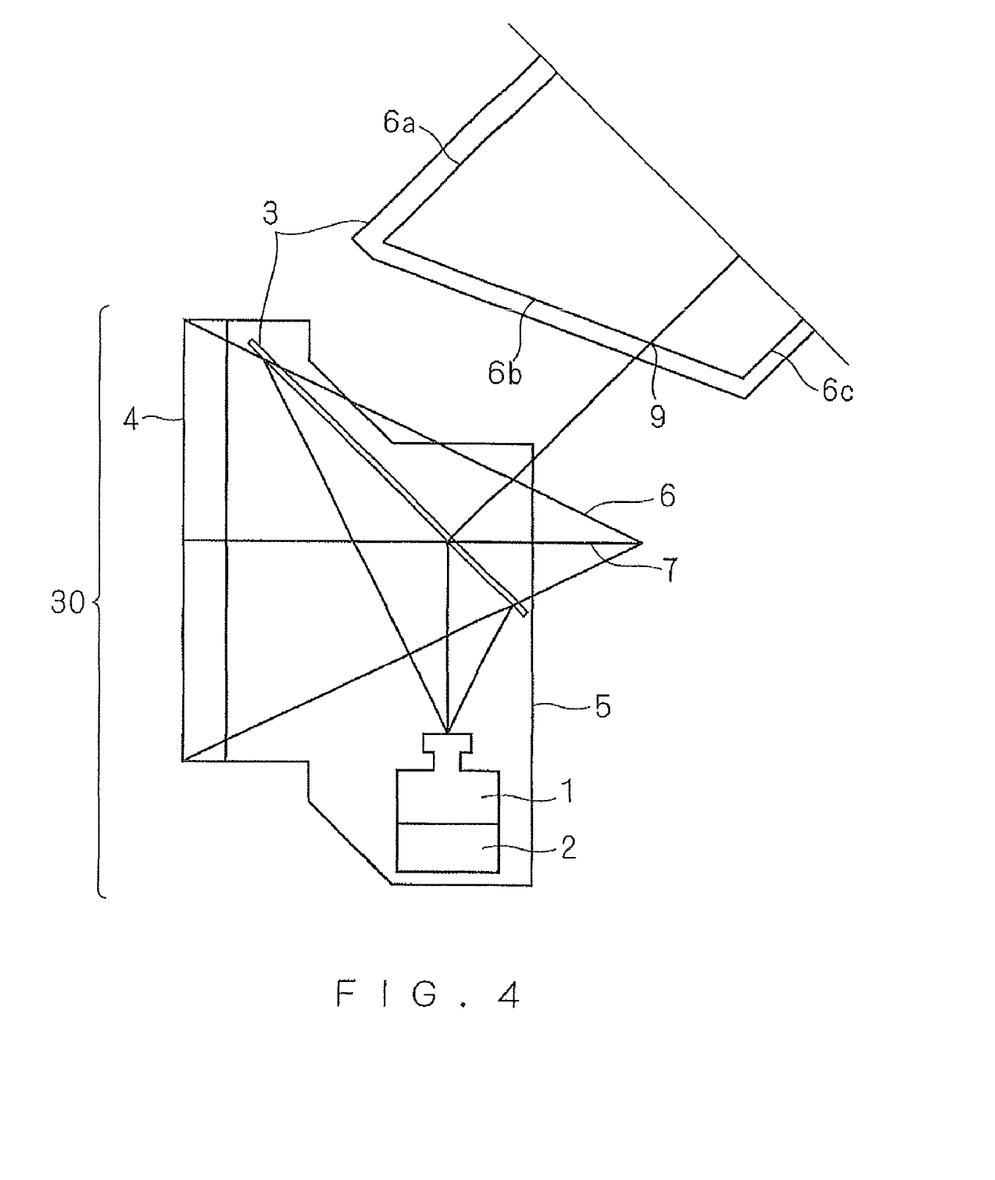
FIG. 4 is a view of a projection layout of the rear projection image display device according to the present invention.

FIG. 4 is not a type of stacking display devices as shown in FIGS. 2 and 3, but a side view of the rear projection image display device 30 configured only by itself. A line 6 is a peripheral line of the image projected from the projection device 1, and a line 7 is a line imagining the center line of the image. The reflection mirror 3 is a trapezoid, and not only a side view, but a view of the half-sized reflection mirror 3 seen from above is simultaneously shown above the rear projection image display device 30 in FIG. 4.

Here, in order to deform the reflection mirror 3 not locally, but radially with each side ends of the reflection mirror 3 as fulcrums, rod-shaped reinforcement members 8a to 8d are fastened with a double-faced tape or a silicon rubber on the rear surface of the reflection mirror 3 along the position where the peripheral line 6 of each side of the image projected from the projection device 1 falls on the reflection mirror 3 (6a, 6b, and 6c shown in FIG. 4).

Figure 5:
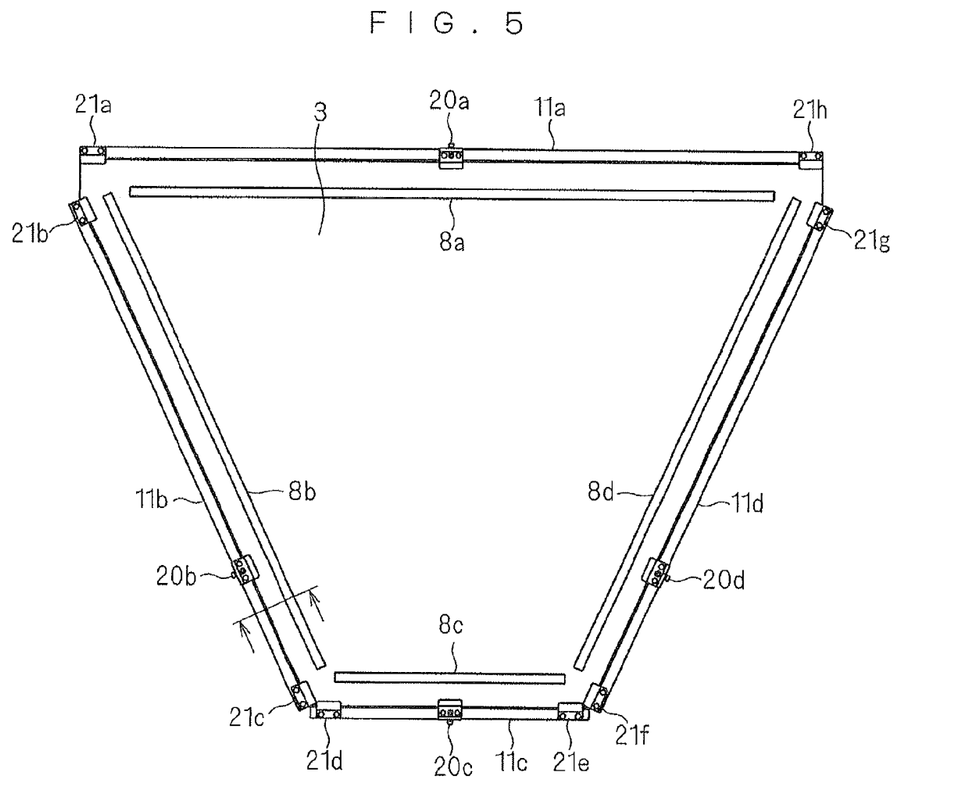
FIG. 5 is a view of a reflection mirror according to the present invention.

FIG. 5 is a view of the reflection mirror 3 seen from above. As described above, the reflection mirror 3 is a trapezoid which is one of polygons, and fixing members 21a to 21h for fixing the reflection mirror 3 are disposed at corners which are several points at the periphery of the trapezoid. The aforementioned rod-shaped reinforcement members 8a to 8d are fastened on the rear surface of the reflection mirror 3 inside the periphery and arranged along the periphery. Also, support members 20a to 20d are disposed at the intermediate locations of sides of the trapezoid.

Here, disposition of the support members 20a to 20d is more specifically shown. As shown in FIG. 5, support members 20a and 20c are disposed near the center of the upper base and the lower base of the trapezoid, respectively. By pushing and pulling the support members 20a and 20c movable in a direction perpendicular to the surface of the reflection mirror 3 in a vertical direction, it is possible to make deflection of the reflection mirror 3, make the reflection mirror 3 flat, and deflect the reflection mirror 3 in an inverse direction. Therefore, in addition to correct deflection of the reflection mirror due to its own weight, optical system distortion due to projection lens is corrected.

Figure 7:
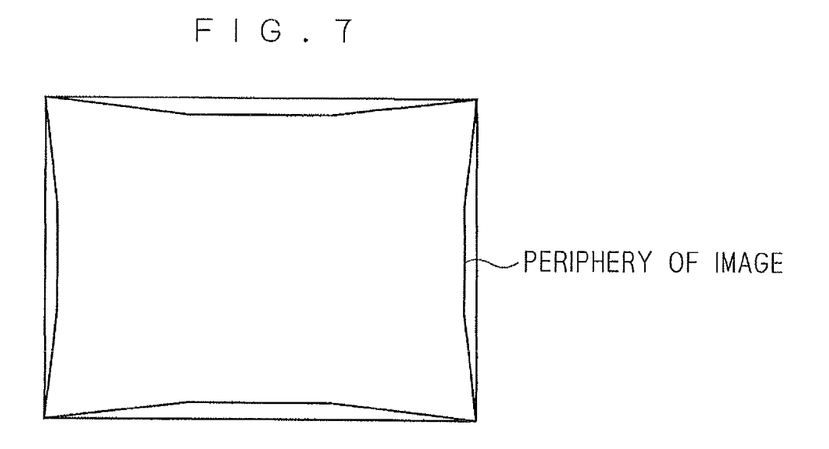
FIGS. 7 and 8 are views of examples of image display distortion.
Figure 8:
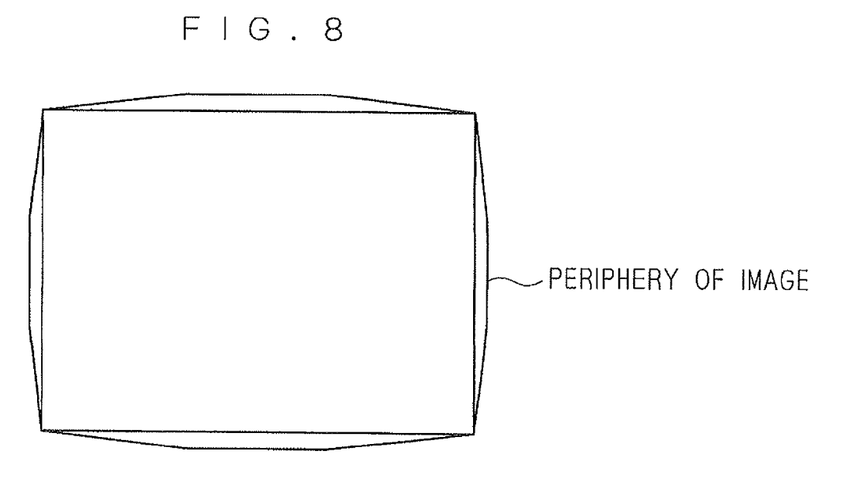
Figure 9:
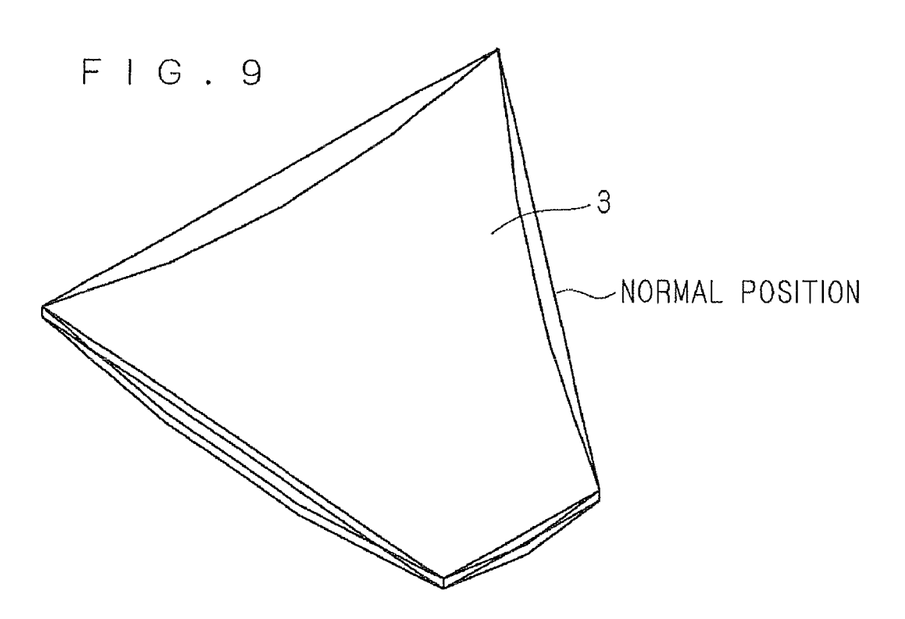
FIG. 9 is a view of deflection of the reflection mirror according to the present invention.

Next, both sides of the trapezoid will be described. With respect to the position adjustment of the both sides of the reflection mirror 3, since the enlargement ratio of the image projected onto the screen 4 is different after changing an optical path at the upper side and the lower side of the reflection mirror 3, the periphery of the image does not show a radial behavior with the center of the image as a vertex as shown in FIGS. 7 and 8 when seen from the screen 4, even if the center of a side of the reflection mirror 3 is pushed and pulled as the upper side and the lower side of the reflection mirror 3 described above.

Thus, as shown in FIG. 4, the support members 20b and 20d are disposed at the intersection of the center line 7 of the image projected from the projection device 1 and the peripheral line 6b of the image of both sides of the trapezoid, that is, near a point 9 connecting the center line of the image and the peripheral line, or at appropriate points between near the aforementioned point 9 and the centroids of both sides of the reflection mirror 3, and the reflection mirror 3 is pushed and pulled in the same way as described above, thereby correcting the periphery of the image to be natural on the screen 4.

As such, the support members 20a to 20d support predetermined points between the fixing members 21a to 21h at the periphery and are movable in a direction perpendicular to the reflection mirror 3.

Figure 6:
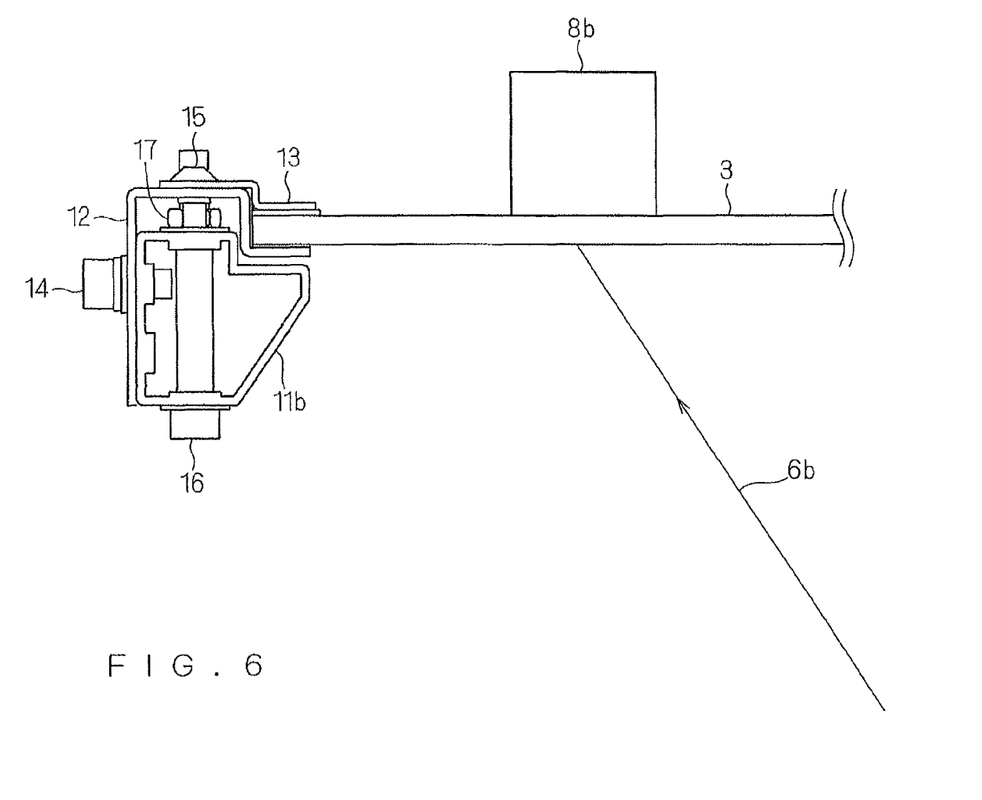
FIG. 6 is a cross-sectional view of a support member of the reflection mirror according to the present invention.

The configuration of the aforementioned support member 20b pushing and pulling one point of each side of the reflection mirror 3, that is, being movable in a direction perpendicular to the reflection mirror 3 will be described in detail hereinafter (the support members 20a to 20d have the same configurations). FIG. 6 is a detail view seen from the direction of arrows in FIG. 5. The reflection mirror 3 is sandwiched between a mirror support member 12 and a mirror support member 13 with a screw 15 (the support member 20b is constituted of the mirror support member 12 and mirror support member 13).

The mirror support member 12 is fixed by a frame 11b surrounding four sides of the reflection mirror 3 and a screw 14. A gap for operating the reflection mirror 3 vertically is provided between the mirror support member 12 and the frame 11b fixing the reflection mirror 3.

An adjustment screw 16 and a nut 17 are previously assembled in the frame 11b. A female screw into which the adjustment screw 16 is inserted is prepared in the mirror support member 12. A hole fixed by the screw 14 is provided as an elongate-shaped hole in an operating direction, thereby operating the reflection mirror 3 with the mirror support member 12 and the mirror support member 13 vertically seen in FIG. 6 by loosening the screw 14 and rotating the adjustment screw 16. That is, the adjustment screw 16 for adjusting the support member 20b to be movable is provided to be operable from below the reflection mirror 3.

The reflection mirror 3 according to the present invention is adjusted by pushing and pulling the reflection mirror 3 and the reinforcement member 8b with the adjustment screw 16 with the frame 11b as a reference position as shown in FIG. 6, so that it is necessary to optimize the rigidity strength of the reinforcement member 8b and the frame 11b. That is, a cross section of the frame 11b must be set larger than moment of inertia (geometrical moment of inertia) combining the reflection mirror 3 and the reinforcement member 8b. This is not limited to the frame 11b and the reinforcement member 8b, but the similar setting is necessary for the frames 11a to 11d and the reinforcement members 8a to 8d.

In the present preferred embodiment, the adjustment screw 16 is disposed to be adjusted from below the reflection mirror 3 as shown in FIG. 6. This is because if the adjustment is possible from below the reflection mirror 3, the adjustment is made possible even in the rear projection image display device 30 requiring the maintenance of the front, not only in the rear part of the rear projection image display device 30 in adjusting. Of course, when the direction of the support members 20a to 20d holding the reflection mirror 3 is reversed, it is possible to adjust from above the reflection mirror 3.

(Effect)

Figure 10:
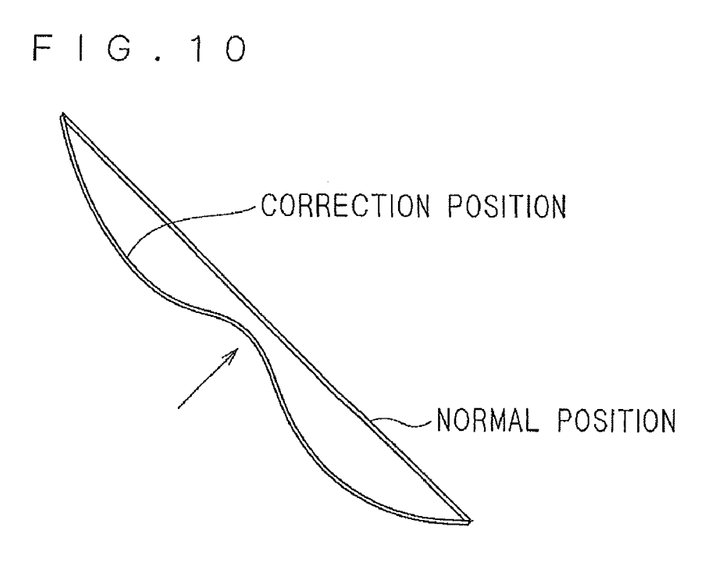
FIG. 10 is a view of deflection of a conventional reflection mirror.
Figure 11:
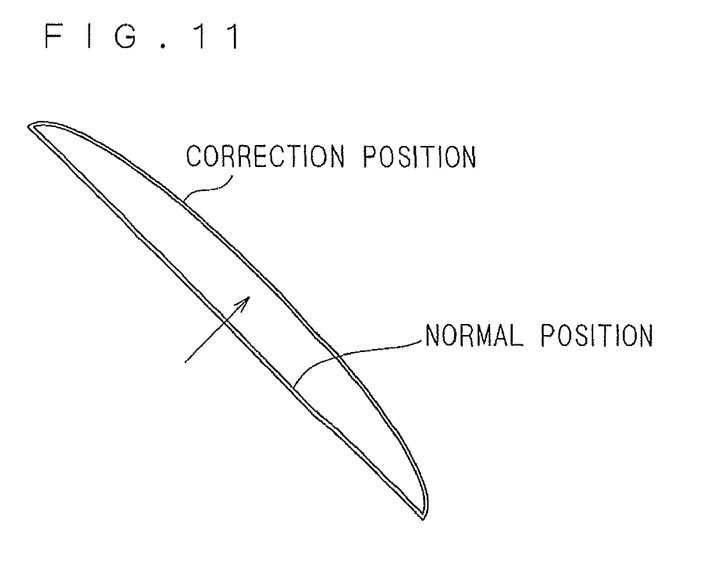
FIG. 11 is a view of deflection of the reflection mirror according to the present invention.
Figure 12:
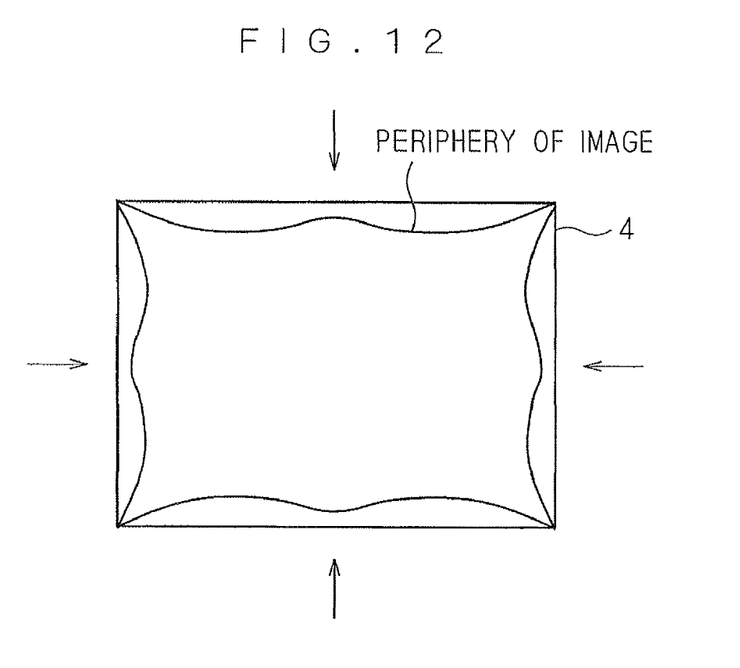
FIG. 12 is a view of an example of image display distortion.

The present invention provides the rear projection image display device 30 reproducing graphics more truly by correcting optical system distortion due to projection lens of the projection device 1 and image distortion due to deflection of the reflection mirror 3 in the rear projection image display device 30 having the reflection mirror 3 by only correcting one part of each side of the reflection mirror 3. FIGS. 10 and 11 are side views of the reflection mirror 3. FIG. 12 shows a condition of a distortion of a screen. Distortion of the screen as shown in FIG. 12 caused by local deformation as shown in FIG. 10 is prevented by correcting one point of each side of the reflection mirror 3. Thereby, it is possible to correct image distortion of each side of the screen to be naturally linear by correcting the reflection mirror 3 to be linear as shown in FIG. 11.

Specifically, in the large screen display system 30a (multi-vision or video wall) configured by stacking rear projection image display devices vertically and horizontally, as shown in FIGS. 2 and 3, distortion correction is made possible by easily adjusting minimum points of each side of the respective screens. Thereby, the large screen display system with high quality and high definition is provided, removing lack of the image among the respective screens in a short time and regardless of ability of an operator.

Furthermore, the rigidity of each side of the reflection mirror 3 is increased by disposing the reinforcement members 8a to 8d along each side of the reflection mirror 3. Thereby, shaking in transportation and oscillation in falling are suppressed, resulting in suppressing the incidence of damage of the reflection mirror 3.

While the invention has been shown and described in detail, the foregoing description is in all aspects illustrative and not restrictive. It is therefore understood that numerous modifications and variations can be devised without departing from the scope of the invention.

What is claimed is:

1. A rear projection image display device for projecting an image from a projection device onto a screen from a rear side, comprising:
    a plane reflection mirror for changing an optical path of the image from said projection device;
    fixing members for fixing more than one points on the periphery of said reflection mirror;
    rod-shaped reinforcement members fastened along said periphery and arranged inside said periphery in the rear side of said reflection mirror;
    support members being movable in a direction perpendicular to a surface of said reflection mirror, for supporting predetermined points between said fixing members on said periphery of said reflection mirror,
    wherein said reinforcement members are arranged along positions where a peripheral line of each side of the image projected from said projection device falls on said reflection mirror.

2. The rear projection image display device according to claim 1, wherein
    said reflection mirror is a polygon,
    said fixing members are disposed at corners of said polygon, and
    said support members are disposed at intermediate locations in the sides of said polygon.

3. The rear projection image display device according to claim 2, wherein
    said reflection mirror is a trapezoid, and
    said support members are disposed near the center of each of the upper base and the lower base of said trapezoid and near intersections of the center line of the image projected from said projection device and the periphery of the image at both sides of said trapezoid.

4. The rear projection image display device according to claim 2, wherein said reflection mirror is a trapezoid, and
    said support members are disposed near the center of each of the upper base and the lower base of said trapezoid, as well as at locations between the centroids position of said reflection mirror in said both sides of said trapezoid and intersections of the center line of the image projected from said projection device and the periphery line of said image at both sides of said trapezoid.

5. The rear projection image display device according to claim 1, wherein said reflection mirror is disposed above said projection device with its reflection surface downward, further comprising a screw for adjusting said support members to be movable, and wherein said screw is arranged so as to be operable from below said reflection mirror.

* * * * *